(12) United States Patent
Li et al.

(10) Patent No.: US 9,267,488 B2
(45) Date of Patent: Feb. 23, 2016

(54) WAVE POWER ENERGY GENERATION USING HYDRAULIC CYLINDERS IN COOPERATION WITH A CROSS LIFTING LEVER

(71) Applicant: Zhejiang Ocean University, Zhoushan (CN)

(72) Inventors: Detang Li, Zhoushan (CN); Yonghe Xie, Zhoushan (CN); Long Shao, Zhoushan (CN)

(73) Assignee: ZHEJIANG OCEAN UNIVERSITY, Dinghai District, Zhoushan, Zhejiang Province (CN)

( * ) Notice: Subject to any disclaimer, the term of this patent is extended or adjusted under 35 U.S.C. 154(b) by 423 days.

(21) Appl. No.: 13/897,345

(22) Filed: May 17, 2013

(65) Prior Publication Data

US 2014/0033701 A1  Feb. 6, 2014

(30) Foreign Application Priority Data

Jul. 31, 2012  (CN) .......................... 2012 1 0267534

(51) Int. Cl.
*F03B 13/22* (2006.01)
*F03B 13/18* (2006.01)

(52) U.S. Cl.
CPC ................. *F03B 13/22* (2013.01); *F03B 13/18* (2013.01); *F03B 13/187* (2013.01); *F05B 2260/406* (2013.01); *Y02E 10/38* (2013.01)

(58) Field of Classification Search
CPC .......... F03B 13/12; F03B 13/14; F03B 13/16; F03B 13/18; F03B 13/22; Y02E 10/38
USPC ......... 60/495, 497, 501, 504, 505; 290/42, 53
See application file for complete search history.

(56) References Cited

U.S. PATENT DOCUMENTS

| | | | | |
|---|---|---|---|---|
| 1,004,332 A | * | 9/1911 | Allen | F03B 13/186 60/507 |
| 1,105,249 A | * | 7/1914 | Bustos | F03B 13/187 417/333 |
| 3,487,228 A | * | 12/1969 | Kriegel | F03B 13/187 290/52 |
| 3,515,889 A | * | 6/1970 | Kammerer | F03B 13/187 290/53 |
| 3,777,494 A | * | 12/1973 | Soderlund | F03B 13/1845 415/7 |
| 4,208,878 A | * | 6/1980 | Rainey | F03B 13/262 290/53 |
| 4,455,824 A | * | 6/1984 | Dabringhaus | F03B 13/186 290/53 |
| 6,389,810 B1 | * | 5/2002 | Nakomcic | F03B 13/186 60/398 |
| 8,004,103 B2 | * | 8/2011 | Brantingham | F03B 13/1845 290/53 |

* cited by examiner

*Primary Examiner* — Thomas Denion
*Assistant Examiner* — Laert Dounis
(74) *Attorney, Agent, or Firm* — Brian S. Boyer; Syndicated Law, PC

(57) ABSTRACT

A wave power generator device having hypoid racks includes a buoyant tank, a roller mechanism, guide posts, a power generation platform, a hydraulic energy conversion mechanism and a cross lifting lever. The power generation platform is mounted on guide posts extended into the seabed. The cross lifting lever is provided in the throughhole in the middle of the platform. The lower part of the cross lifting lever is fixed with the buoyant tank by a movable connection rod. The roller mechanism is mounted at both sides of the buoyant tank and appressed to the guide posts. The hydraulic energy conversion mechanism includes a housing, one-way hydraulic cylinders, rolling wheels and is mounted on the power generation platform in cooperation with the cross lifting lever to achieve energy conversion motion to solve the control and adaption problem for a water level difference during the wave power generation.

5 Claims, 4 Drawing Sheets

A-A

WAVE POWER ENERGY GENERATION USING HYDRAULIC CYLINDERS IN COOPERATION WITH A CROSS LIFTING LEVER

CROSS-REFERENCE TO RELATED APPLICATIONS

This application claims the benefit of Chinese Application No 201210267534.1, filed Jul. 31, 2012, which is hereby incorporated herein by reference in its entirety.

TECHNICAL FIELD

The present invention relates to a power generation platform, particularly relates to a wave power generator device having hypoid racks, which belongs to ocean energy equipment field.

BACKGROUND OF THE INVENTION

The existing wave energy power generation platforms are ultimately fixed type and accordingly are provided with a very long piston rod for an oil cylinder. With the structure, the oil cylinder piston rod is inefficient in rigidity, is not stable enough, and has a quite short lifetime, so as not to apply to high power generator group to generate power, which is an urgent issue to be solved.

SUMMARY OF THE INVENTION

The present invention aims to provide a wave power generator device having hypoid racks.

The problem to be solved by the present invention is the disadvantage that the usable lifetime of existing long oil cylinder piston rod type power generation platform is short and is not satisfied for high power generation.

To achieve the purpose of the present invention, the technical solution of the present invention is that:

A wave power generator device having hypoid racks includes a buoyant tank, a roller mechanism, guide posts, a power generation platform, a hydraulic energy conversion mechanism and a cross lifting lever. The guide posts are extended into the seabed. The power generation platform is mounted on the guide posts. The cross lifting lever is provided in the throughhole in the middle of the power generation platform. The lower part of the cross lifting lever is fixed with the buoyant tank by a movable connection rod. The roller mechanism is mounted at both sides of the buoyant tank and is appressed to the guide post. The hydraulic energy conversion mechanism is mounted on the power generation platform and is mutually cooperated with the cross lifting lever to achieve energy conversion motion.

The said hydraulic energy conversion mechanism includes a housing, one-way hydraulic cylinders and rolling wheels. The rolling wheels are mounted at the heads of the one-way hydraulic cylinders. Eight sets of one-way hydraulic cylinders are provided in the housing. Four sets at either side are symmetrical each other, the gap between which is used to pass the cross lifting lever through.

The said cross lifting lever includes two curvilinear racks and two linear racks which are symmetrically mounted. Both of the curvilinear racks are provided with a cycloid structure. The number of said guide posts is three. The three guide posts center around the cross lifting lever and have an equal clearance. The corresponding buoyant tank is appressed to the guide posts by the roller mechanism. The distance between the upper and lower rolling wheels is ¾ of the distance from the peaks to the valleys of the curvilinear racks.

The advantage of the present invention is that the control and adaption problem for a water level difference during the wave power generation is solved by the cooperation of the hydraulic energy conversion mechanism with the cross lifting lever in the device, so that the problem that the existing power generation platform can not change with the water level is solved and the high power generator group is suitable for the wave power generation and has a wide market space.

Figure 1:
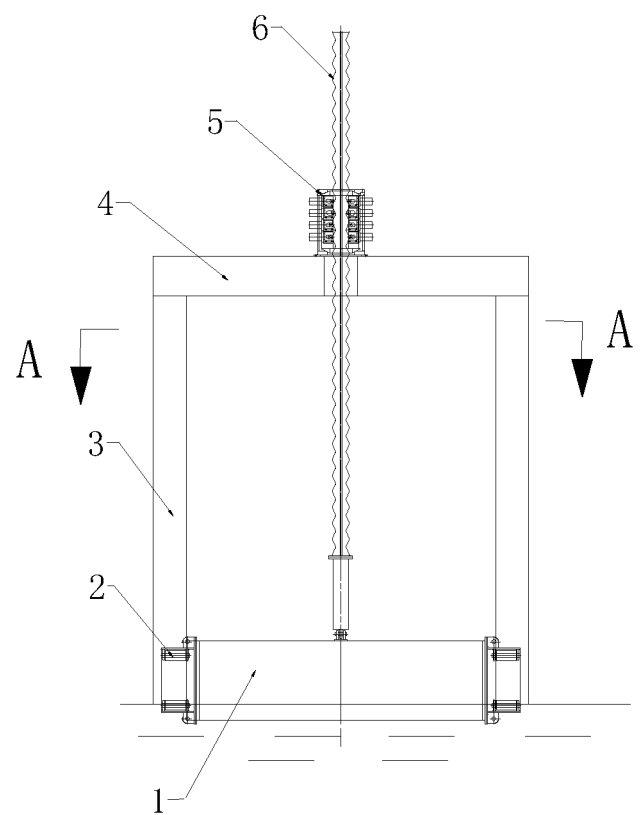
FIG. 1 is the front view of a wave power generator device having hypoid racks, according to some embodiments.
Figure 2:
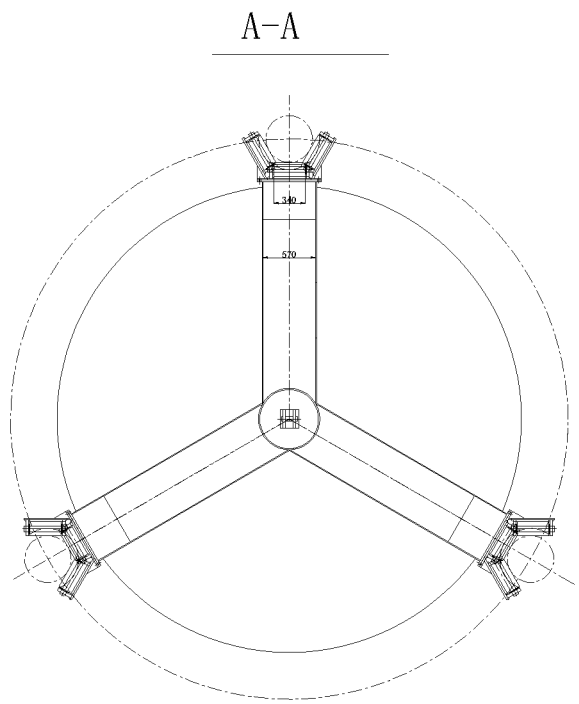
FIG. 2 is the A-A view of the wave power generator device having hypoid racks, according to some embodiments.
Figure 3:
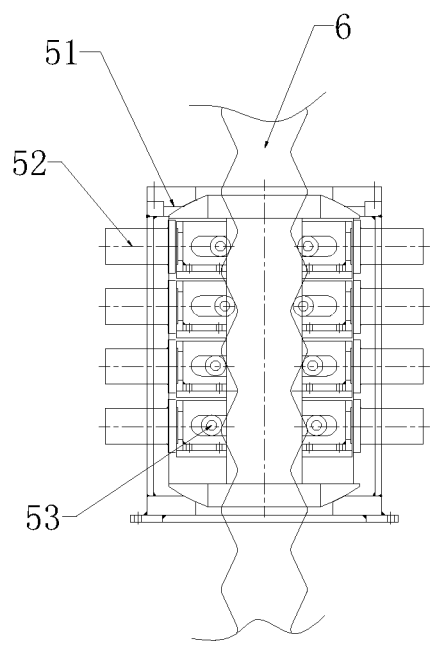
FIG. 3 is a diagram of the hydraulic energy conversion mechanism, according to some embodiments.
Figure 4:
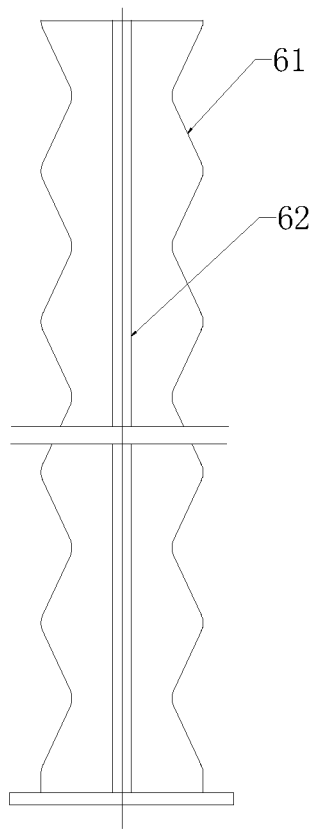
FIG. 4 is the front view of the cross lifting lever, according to some embodiments.
Figure 5:
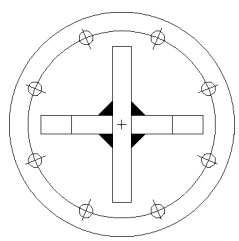
FIG. 5 is the top view of the cross lifting lever, according to some embodiments.
Figure 6:
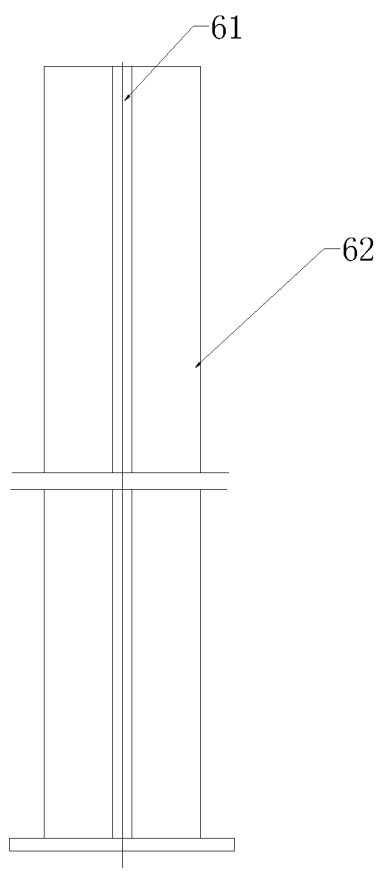
FIG. 6 is the left view of the cross lifting lever, according to some embodiments.

Wherein: 1. buoyant tank; 2. roller mechanism; 3. guide post; 4. power generation platform; 5. hydraulic energy conversion mechanism; 6. cross lifting lever; 51. housing; 52. one-way hydraulic cylinder; 53. rolling wheel; 61 curvilinear rack; 62 linear rack.

DETAILED DESCRIPTION OF THE PREFERRED EMBODIMENT

Hereafter, a further description is made to the embodiments provided herein in conjunction with the drawings and embodiments.

As shown in the figures, a wave power generator having hypoid racks includes a buoyant tank 1, a roller mechanism 2, guide posts 3, a power generation platform 4, a hydraulic energy conversion mechanism 5 and a cross lifting lever 6, which is characterized in that the guide posts 3 are extended into the seabed. The power generation platform 4 is mounted on the guide posts 3. The cross lifting lever 6 is provided in the throughhole in the middle of the platform 4. The lower part of the cross lifting lever 6 is fixed with the buoyant tank 1 by a movable connection rod. The roller mechanism 2 is mounted at both sides of the buoyant tank 1 and appressed to the guide posts 3. The hydraulic energy conversion mechanism 5 is mounted on the power generation platform 4 and is mutually cooperated with the cross lifting lever 6 to achieve energy conversion motion.

The hydraulic energy conversion mechanism 5 includes a housing 51, one-way hydraulic cylinders 52, and rolling wheels 53. The rolling wheels 53 are mounted at the heads of the one-way hydraulic cylinders 52. Eight sets of one-way hydraulic cylinders 52 are provided in the housing 51. Four sets at either side are symmetrical each other, the gap between which is used to pass the cross lifting lever 6 through.

The cross lifting lever 6 includes two curvilinear racks 61 and two linear racks 62 which are symmetrically mounted. Both of the curvilinear racks 61 are provided with a cycloid structure, so as to reduce the friction force between the curvilinear racks 61 and the rolling wheels 53 during the cooperative motion and to cause the rolling wheels 53 to achieve stable transfer from the peaks to the valleys of the curve racks 61.

The number of the guide posts 3 is three. The three guide posts 3 center around the cross lifting lever 6 and have an equal clearance. The corresponding buoyant tank 1 is appressed to the guide posts 3 by the roller mechanism 2, which become a triangle structure, so as to increase the capability of resisting the winds and the waves and improve the lifetime.

The distance between the upper and lower rolling wheels 53 is ¾ of the distance from the peaks to the valleys of the curvilinear racks 61, so that the problem of mutual dead space is not created, so as to improve energy conversion efficiency.

The application method of the present device is as follows: when the whole device is completely mounted, the fluctuation of the buoyant tank 1 with the wave leads the cross lifting lever 6 to achieve the up-and-down motion with the cooperation of the guide posts 3. The back-and-forth motion of the one-way hydraulic cylinders 52 are leaded in the hydraulic energy conversion mechanism 5 at the same time as the upper-and-down motion of the cross lifting lever 6, so that the mechanical energy of the buoyant tank 1 is converted into hydraulic energy to be stored and generate electric power. The device has large energy conversion density and is suitable for the industrialization of the large-scale offshore hydraulic power generation apparatus.

We claim:

1. A wave power generator device includes a buoyant tank (1), a roller mechanism (2), guide posts (3), a power generation platform (4), a hydraulic energy conversion mechanism (5) and a cross lifting lever (6), which is characterized in that the guide posts (3) are extended into the seabed, the power generation platform (4) is mounted on the guide posts (3), the cross lifting lever (6) is provided in the throughhole at the middle of the platform (4), the lower part of the cross lifting lever (6) is fixed with the buoyant tank (1) by a movable connection rod, and the roller mechanism (2) is mounted at both sides of the buoyant tank (1) and appressed to the guide posts (3); the hydraulic energy conversion mechanism (5) is mounted on the power generation platform (4) and is mutually cooperated with the cross lifting lever (6) to achieve energy conversion motion, wherein the hydraulic energy conversion mechanism (5) includes a housing (51), one-way hydraulic cylinders (52) and rolling wheels (53), the rolling wheel (53) is mounted at the head of the one-way hydraulic cylinder (52), eight sets of one-way hydraulic cylinders (52) are provided in the housing (51), and four sets at either side are symmetrical to each other, the gap between which is used to cross the cross lifting lever (6).

2. The wave power generator device according to claim 1, characterized in that said cross lifting lever (6) includes two curvilinear racks (61) and two linear racks (62) which are symmetrically mounted, and both of the curvilinear racks (61) are provided with a cycloid structure.

3. The wave power generator device according to claim 1, characterized in that the number of said guide posts (3) is three, the three guide posts (3) center around the cross lifting lever (6) and have an equal clearance, and the corresponding buoyant tank (1) is appressed to the guide posts (3) by the roller mechanism (2).

4. The wave power generator device according to claim 2, wherein the distance between the upper and lower rolling wheels (53) is ¾ of the distance from the peaks to the valleys of the curvilinear racks (61).

5. The wave power generator device according to claim 4, characterized in that the number of said guide posts (3) is three, the three guide posts (3) center around the cross lifting lever (6) and have an equal clearance, and the corresponding buoyant tank (1) is appressed to the guide posts (3) by the roller mechanism (2).

\* \* \* \* \*